United States Patent
Iwamoto et al.

(10) Patent No.: US 7,538,725 B2
(45) Date of Patent: May 26, 2009

(54) GPS POSITIONING METHOD AND GPS POSITION DEVICE

(75) Inventors: Takashi Iwamoto, Tokyo (JP); Takafumi Nagano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 11/997,455

(22) PCT Filed: Aug. 18, 2005

(86) PCT No.: PCT/JP2005/015058
§ 371 (c)(1),
(2), (4) Date: Jan. 31, 2008

(87) PCT Pub. No.: WO2007/020693
PCT Pub. Date: Feb. 22, 2007

(65) Prior Publication Data
US 2008/0231509 A1 Sep. 25, 2008

(51) Int. Cl.
*G01S 5/14* (2006.01)
(52) U.S. Cl. .................................. 342/357.12
(58) Field of Classification Search ............. 342/357.12
See application file for complete search history.

(56) References Cited

U.S. PATENT DOCUMENTS

| | | | |
|---|---|---|---|
| 5,576,715 A * | 11/1996 | Litton et al. ........... | 342/357.12 |
| 5,663,734 A | 9/1997 | Krasner | |
| 2004/0072577 A1 * | 4/2004 | Myllymaki et al. ......... | 342/387 |

FOREIGN PATENT DOCUMENTS

| | | |
|---|---|---|
| JP | 10-503584 | 3/1998 |
| JP | 11-513787 | 11/1999 |
| JP | 3270407 | 1/2002 |
| JP | 2002-540433 | 11/2002 |
| JP | 2002-541436 | 12/2002 |
| JP | 2004-501352 | 1/2004 |
| JP | 2004-340855 | 12/2004 |
| JP | 2005-500731 | 1/2005 |
| JP | 2005-513449 | 5/2005 |

OTHER PUBLICATIONS

Norman F. Krasner, "Optimum C/A Code Ranging Methods and Performance Evaluation" ION GNSS 17th International Technical Meeting of the Satellite Division, Sep. 21-24, 2004, pp. 501-509.

Mark L. Psiaki, et al. "Extended Kalman Filter Methods for Tracking Weak GPS Signals" ION GPS 2002, Sep. 24-27, 2002, pp. 2539-2553.

Pratap Misra, et al. "Global Positioning System: Signals, Measurements and performance" Seiyo Bunko, 2004, Chapter 9, Section 2, pp. 303-309.

David M. Lin, et al. "A Software GPS Receiver for Weak Signals", THIF-37, IEEE MTT-S Digest, 2001, pp. 2139-2142.

* cited by examiner

*Primary Examiner*—Thomas H Tarcza
*Assistant Examiner*—Fred H Mull
(74) *Attorney, Agent, or Firm*—Oblon, Spivak, McClelland, Maier & Neustadt, P.C.

(57) ABSTRACT

In the present invention, a conditional probability distribution function of received signal which is conditioned with a received signal amplitude (a), a pseudo range (p) and a navigation bit ($b_m$) which are unknown parameters is acquired from a GPS signal sample S2 on the basis of a condition defined by a working hypothesis set in a working hypothesis setting part WH(i) and then the conditional probability distribution function ($P(R_m|a, p, b_m)$) is marginalized with respect to the pseudo range (p) to acquire a marginal posterior probability distribution function ($P(p|R_m, a)$) in a step ST11. Finally acquired is a pseudo range dependent function in proportion to the marginal posterior probability distribution function ($P(p|R_m, a)$). Then, in a step ST12, a value of pseudo range (p) which gives the maximum value of pseudo range dependent function is determined as an estimated pseudo range.

6 Claims, 3 Drawing Sheets

F I G . 1
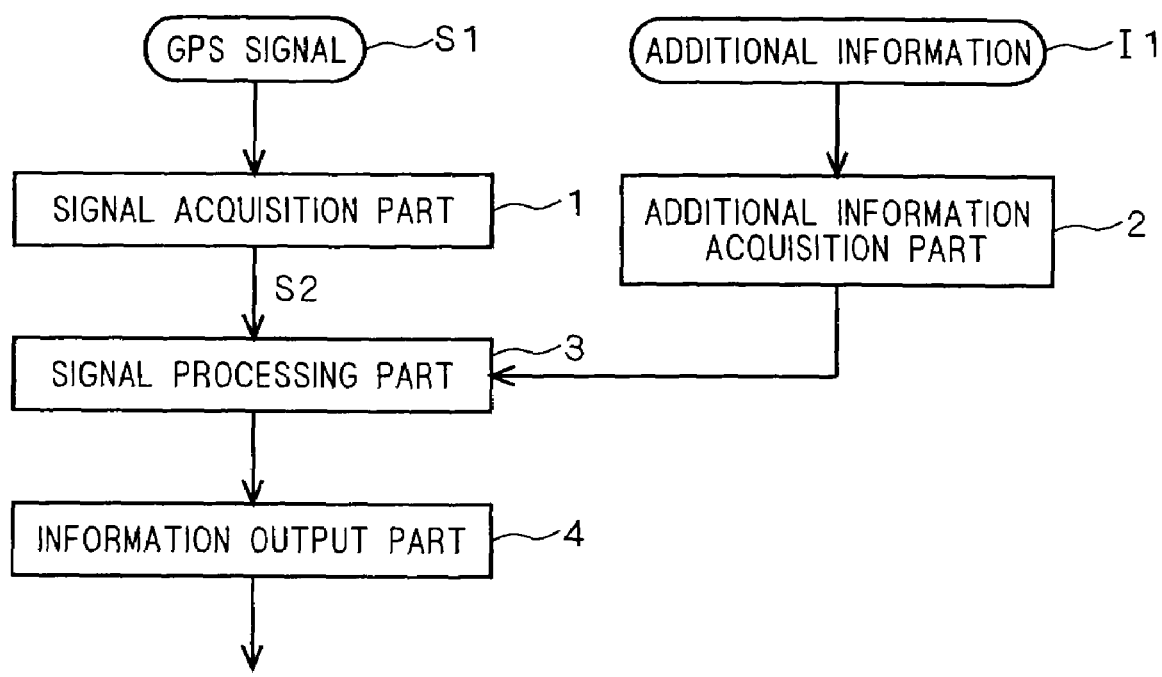

GPS POSITIONING METHOD AND GPS POSITION DEVICE

TECHNICAL FIELD

The present invention relates to a GPS positioning method for receiving a signal from a GPS (Global Positioning System) satellite to detect a receiving position and a GPS positioning apparatus used therefor.

BACKGROUND ART

A GPS satellite now uses a band called link 1 (L1) having a center frequency of 1575.42 MHz and a band called link 2 (L2) having a center frequency of 1227.60 MHz. A signal from the satellite includes a code obtained by modulating a PRN (Pseudo Random Noise) code with a navigation bit as discussed later. In the present description, it is assumed that bit should mathematically take "−1" or "1". Among the PRN codes, the code opened to civilians is a C/A code of the L1 band. The C/A code of each satellite belongs to the line of 1023 bits inherent in satellites, which is known as a gold code having a length of 1023. Each bit is often called a chip. The C/A code is transmitted at a chip rate of 1.023 MHz and repeated at one millisecond intervals. Each satellite represents data (called navigation data) required for measurement of position, such as self-position, the amount of self-clock correction and the like, as navigation bits, and 20 successive C/A codes as one unit are modulated by binary phase to be transmitted. Therefore, the navigation bits are transmitted at a bit rate of 50 bps, and the change of the navigation bits coincide with the boundary of the C/A codes.

A signal y[k] which is sent out from one GPS satellite, being discretized at a time cycle of Δt seconds, and arrives at a receiver antenna at a time t[k] (k=0, 1, 2, ...) is modeled as expressed by Eq. 1. In Eq. 1, "a" represents an amplitude of a received signal, pΔt second represents a time period needed to transmit the signal, b[k−p] and x[k−p] represent a value of navigation bit and a value of C/A code, respectively, when sent out, "f" represents the number of frequencies of a carrier wave and n[k] represents a noise superimposed on the received signal at the time t[k].

$$y[k]=ab[k-p]x[k-p]\cos 2\pi fk\Delta t+n[k], (k=0,1,2\ldots) \quad (1)$$

A receiver usually acquires a signal (baseband signal) with carrier wave components removed, by multiplying the signal by an oscillator signal, as expressed by Eq. 2.

$$y[k]=ab[k-p]x[k-p]+n[k], (k=0,1,2\ldots) \quad (2)$$

The carrier wave frequency f is, however, generally different from the center frequency of the like 1 due to the Doppler shift caused by movements of the satellite and the receiver. Further, the frequency to be multiplied sometimes includes an error due to the error of an oscillator. Therefore, there may be a case where all the carrier wave components are not removed and some of them superimposes the baseband signal. In the present description, for simplification, discussion will be first made on a case where all the carrier wave components are removed.

Now considered will be a case where one of C/A codes is sampled at N KHz (N=1023×integer (≧1), where Δt=$10^{-3}$/N) for one millisecond from the boundary of repetition. The sample value of C/A code has a domain which satisfies the periodic boundary condition x[k+N]=x[k] and can be extended. In this case, an autocorrelation function A[j] of the sample x[k] for one millisecond is defined as Eq. 3:

$$A[j] = \frac{1}{N}\sum_{k=0}^{N-1} x[k]x[k-j], (j=0, \pm1, \pm2\ldots) \quad (3)$$

It is known that the autocorrelation function A[j] takes the maximum value of "1" when j=0 and in the neighborhood of j=0, the autocorrelation function A[j] sharply decreases and takes a very small value as compared with "1" in the range of |j|≧N/1023. Moreover, a cross-correlation function C[j] for one millisecond with respect to a C/A code x'[k] of a different satellite is expressed by Eq. 4:

$$C[j] = \frac{1}{N}\sum_{k=0}^{N-1} x'[k]x[k-j], (j=0, \pm1, \pm2\ldots) \quad (4)$$

It is known that the cross-correlation function C[j] takes a very small value as compared with "1" with respect to arbitrary j. Theses properties largely help estimation of a signal propagation time from each GPS satellite or a pseudo range. The cross-correlation function between the received signal for one millisecond with the navigation bit not changed and the C/A code is transformed as expressed by Eq. 5:

$$R[j] = \frac{1}{N}\sum_{k=0}^{N-1} y[k]x[k-j]$$

$$= \frac{a}{N}\sum_{k=0}^{N-1} b[k-p]x[k-p]x[k-j] + \frac{1}{N}\sum_{k=0}^{N-1} n[k]x[k-j]$$

$$= abA[j-p] + \frac{1}{N}\sum_{k=0}^{N-1} n[k]x[k-j] \quad (5)$$

In the transformation from the second line to the third line of Eq. 5, used is a hypothesis that the navigation bit b[k−p] takes a constant value b in the range of 0≦k≦N−1. Since the first term has a sharp peak at j=p, as discussed earlier, when the signal amplitude a is sufficiently large with respect to the noise term of the second term, it is possible to estimate the signal propagation time pΔt from the GPS satellite to the receiver by detecting the peak of the cross-correlation function. If signal noise power ratio is not sufficient, however, it is impossible to discriminate the peak of the correlation function from the noise.

Though the cross-correlation function for one millisecond which corresponds to one cycle of the C/A code is used in the above case, if the navigation bit is not changed for M milliseconds which correspond to M cycles of the navigation bit, the cross-correlation function for M milliseconds can be similarly used. If the noise is independently Gaussian one, the signal noise power ratio between the peak of the first term and the noise intensity of the second term can be multiplied by M and it is therefore possible to improve the sensitivity of the receiver.

If all the carrier wave components are not removed, the peak of the autocorrelation function is impaired and the sensitivity is deteriorated. Non-Patent Document 1 is known as a method to suppress deterioration of sensitivity, where the highest peak is obtained by making a working hypothesis of possible frequency shift, correcting the frequency for the shift from the received signal and observing a cross-correlation peak. Further, as a specific example of GPS receiver, for example, a system disclosed in Patent Document 1 may be used.

In a GPS positioning system and a GPS positioning apparatus disclosed in Patent Document 1, in a process of signal processing on a received GPS signal before correlation calculation, which is called preliminary integration, the preliminary integration is performed with respect to 5 to 10 PN frames for avoiding the influence of a decrease in integral effect due to polarity reversal of the navigation data in order to achieve high sensitivity. In the phase of C/A code included in the received GPS signal, the polarity of a section phase of navigation data is reversed depending on the details of the navigation data. Therefore, since the polarity of C/A code is changed with the navigation data in such processing, when integration (cumulative addition) is performed with the polarity of C/A code, the signal components are offset and disadvantageously become not sufficient for improvement in sensitivity (S/N). In other words, the boundary of polarity reversal of the navigation data is not detected. For this reason, the number of integrals theoretically has limitations and improvement of sensitivity (S/N) is insufficient.

In a positioning process, a remote unit serving as a terminal acquires Doppler information from a base station every time, calculates a pseudo range to each visible satellite and detects a terminal position on the basis of the pseudo range or by sending the calculation result to a server. For this reason, every time when the position is measured, it is necessary to communicate with the server and this causes a problem of needing communication costs.

As another example of GPS receiving system, Patent Document 2 discloses a receiving system. In this receiving system, in order to add a peak power of cross-correlation function, regardless of any change of navigation bits, the absolute value or the square of peak power is calculated and added.

If this system is used, however, since a noise component is also added, there is a problem that the ratio of improvement in signal noise ratio relatively to an increase in the number of samples decreases.

As still another example of GPS receiver, Patent Document 3 discloses a GPS positioning system and a GPS positioning apparatus. In the GPS positioning system, however, if an incoming signal from a satellite is very weak, unless a correct navigation bit boundary can be estimated, there is a possibility that a correlation peak exceeding the noise intensity can not be obtained. In other words, there is a problem that no judgment can be made on which is the cross-correlation peak since it is buried in a noise peak.

As a system for suppressing deterioration of signal noise ratio due to the change of navigation bits, Non-Patent Document 2 discloses a system.

This system divides samples into sets by 10 milliseconds and divides the sets into two groups, one for the odd numbers (U1, U2, . . . ) and the other for the even numbers (V1, V2, . . . ). Since the change of navigation bits is caused every 20 milliseconds, the samples are included in either of the two groups. In other words, either one of a working hypothesis that no change of navigation bits is included in the group of sample sets U1, U2, . . . and another working hypothesis that no change of navigation bits is included in the group of sample sets V1, V2, . . . is true. By calculating the cross-correlation function on the premise of each working hypothesis, processing without any effect of the change of navigation bits can be performed on at least one group.

Non-Patent Document 1: written by P. Misra and P. Enge, translated by Japan Institute of Navigation, GPS Research Committee, "Global Positioning System: Signals, Measurements and Performance" (Japanese Title: "Seiei GPS"), Seiyou Bunko, 2004 (pp. 303-309, Chapter 9, Section 2, "Signal Acquisition", especially, last paragraph of page 308)

Patent Document 1: U.S. Pat. No. 5,663,734 (FIG. 3)

Patent Document 2: National Publication of Translation No. 11-513787 (FIG. 3)

Patent Document 3: U.S. Pat. No. 3,270,407 (page 10, FIG. 1)

Non-Patent Document 2: by David M. Lin and B. Y. Tsui: "A Software GPS Receiver for Weak Signals", IEEE Microwave Theory and Technology Society Digest, page 2139 (2001)

DISCLOSURE OF INVENTION

The present invention is intended to solve the above problems of the Background Art, and it is an object of the present invention to provide a GPS positioning method capable of measuring a pseudo range with high accuracy even if a navigation bit is unknown.

The present invention is intended for a GPS positioning method for estimating a pseudo range from a GPS signal. According to a first aspect of the present invention, the GPS positioning method includes the steps of (a) acquiring a signal sample by receiving the GPS signal, (b) acquiring a pseudo range dependent function which is a function of pseudo range in proportion to a marginal posterior probability distribution function of pseudo range from the signal sample on the basis of a condition defined by a predetermined working hypothesis, and (c) determining a value of pseudo range which gives the maximum value of the pseudo range dependent function as an estimated pseudo range.

The present invention is also intended for a GPS positioning apparatus for estimating a pseudo range from a GPS signal. According to a sixth aspect of the present invention, the GPS positioning apparatus includes a signal acquisition part for acquiring a signal sample by receiving the GPS signal, and a signal processing part for determining an estimated pseudo range by performing signal processing on the basis of the signal sample, and in the GPS positioning apparatus, the signal processing part acquires a pseudo range dependent function which is a function of pseudo range in proportion to a marginal posterior probability distribution function of pseudo range from the signal sample on the basis of a condition defined by a predetermined working hypothesis and determines a value of pseudo range which gives the maximum value of the pseudo range dependent function as an estimated pseudo range.

In the GPS positioning method according to the first aspect of the present invention, since a pseudo range dependent function is acquired from the signal sample of the GPS signal on the basis of the condition defined by the predetermined working hypothesis in the step (b) and the value of pseudo range which gives the maximum value of the pseudo range dependent function is determined as an estimated pseudo range in the step (c), the estimation of pseudo range becomes statistically optimal and it advantageously becomes possible to maximize the sensitivity.

Further, since the pseudo range dependent function is a function in proportion to the marginal posterior probability distribution function of pseudo range, it is possible to measure the pseudo range with high accuracy with respect to a GPS signal on which an unknown navigation bit is superimposed.

In the GPS positioning apparatus according to the sixth aspect of the present invention, since the signal processing part determines the value of pseudo range which gives the maximum value of the pseudo range dependent function which is finally acquired from the signal sample of the GPS signal on the basis of the condition defined by the predetermined working hypothesis as an estimated pseudo range, the estimation of pseudo range becomes statistically optimal and it advantageously becomes possible to maximize the sensitivity.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a block diagram showing a constitution of a GPS positioning apparatus in accordance with a first preferred embodiment of the present invention;

DESCRIPTION OF REFERENCE NUMERALS

1: signal acquisition part, 2: additional information acquisition part,
3: signal processing part, 4: information output part

BEST MODE FOR CARRYING OUT THE INVENTION

The First Preferred Embodiment

FIG. 1 is a block diagram showing a constitution of a GPS positioning apparatus in accordance with the first preferred embodiment of the present invention. As shown in FIG. 1, a signal acquisition part 1 receives a GPS signal S1 which is a radio wave sent out from a GPS satellite and samples the GPS signal S1 to acquire a GPS signal sample S2. Then, an additional information acquisition part 2 acquires additional information I1 and outputs it to a signal processing part 3. The additional information I1 includes, for example, information on a satellite position, Doppler, or the like which a base station (a receiving unit capable of receiving a GPS signal by a receiving antenna set on an environment commanding a fine view) receives from a satellite and a rough position of a terminal estimated by the base station.

The signal processing part 3 performs signal processing as discussed later in detail, by using the additional information I1 as necessary on the basis of the GPS signal sample S2 to determine an estimated pseudo range for each of a plurality of working hypotheses. An information output part 4 outputs the most optimal one out of the estimated pseudo ranges for the above working hypotheses as an optimal estimated pseudo range. Among the above-described constituent elements, already-existing constituent elements may be used as the signal acquisition part 1 and the additional information acquisition part 2.

Figure 2:
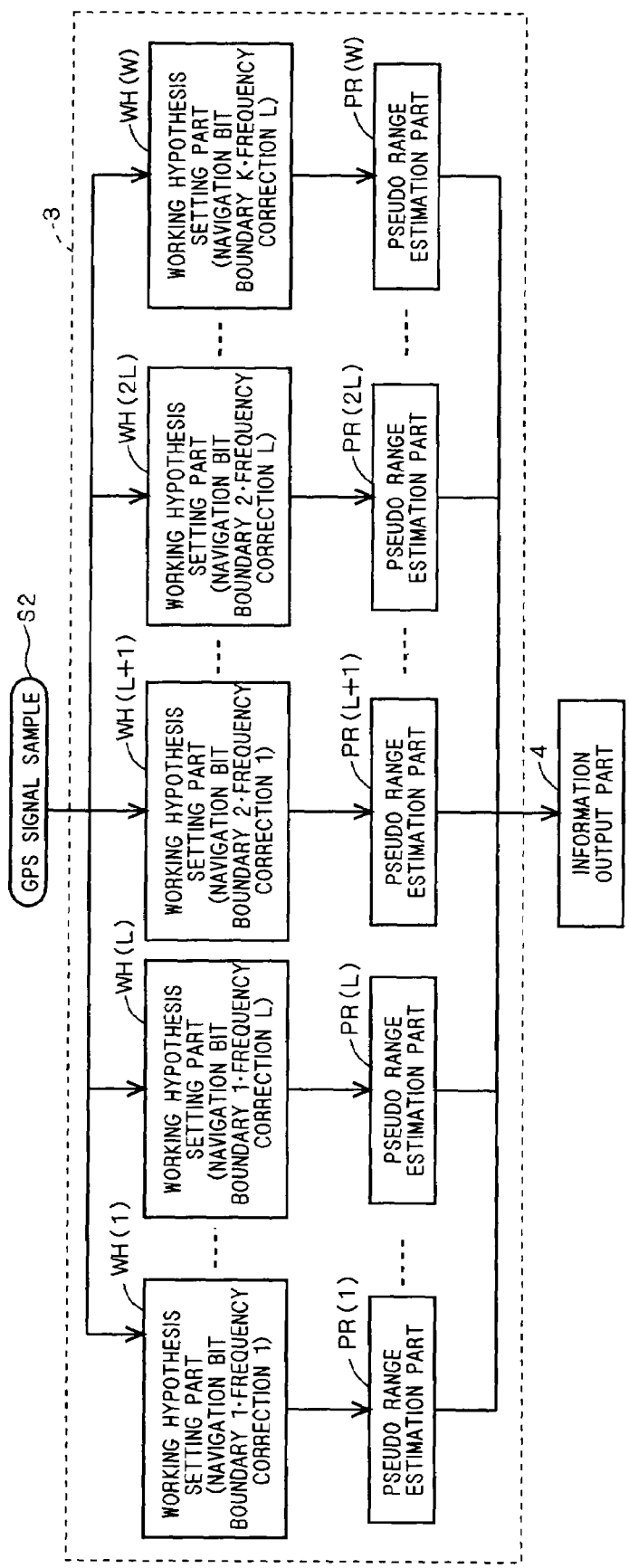
FIG. 2 is a block diagram showing an internal constitution of a signal processing part of FIG. 1.

FIG. 2 is a block diagram showing an internal constitution of the signal processing part 3 in detail. As shown in FIG. 2, the signal processing part 3 consists of working hypothesis setting parts WH(1) to WH(W) (W=K×L) and pseudo range estimation parts PR(1) to PR(W). The working hypothesis setting part WH(1) sets the first working hypothesis with navigation bit boundary 1 and frequency correction 1, the working hypothesis setting part WH(L) sets the L-th working hypothesis with navigation bit boundary 1 and frequency correction L, the working hypothesis setting part WH(L+1) sets the (L+1)th working hypothesis with navigation bit boundary 2 and frequency correction 1, the working hypothesis setting part WH(2L) sets the 2L-th working hypothesis with navigation bit boundary 2 and frequency correction L and the working hypothesis setting part WH(W) sets the W(=K×L)-th working hypothesis with navigation bit boundary K and frequency correction L.

Since the amount of correction for any one working hypothesis can fall within ±5 Hz from the true value by making working hypotheses on the amount of frequency correction at 10 Hz intervals and making correction as one example of the above-discussed frequency correction, it is possible to estimate a pseudo range while suppressing deterioration in sensitivity due to frequency drift. On the other hand, since the amount of correction for any one working hypothesis can fall within ±1 millisecond from the true value by making working hypotheses on navigation bit boundary at 2 milliseconds intervals and making correction, it is possible to estimate a pseudo range while suppressing deterioration in sensitivity due to boundary shift.

As discussed above, the working hypothesis setting parts WH(1) to WH(W) totally set W (=K×L) working hypotheses by combining K working hypotheses on navigation bit boundary and L working hypotheses on frequency correction. Further, in setting the working hypotheses, the working hypothesis setting parts WH(1) to WH(W) can use the additional information I1 acquired through the additional information acquisition part 2.

The pseudo range estimation parts PR(1) to PR(W) provided correspondingly to the working hypothesis setting parts WH(1) to WH(W) perform signal processing on the GPS signal samples S2 on the basis of the working hypotheses set by the respective working hypothesis setting parts WH(1) to WH(W), to acquire pseudo ranges EP1 to EPW.

The information output part 4 outputs one estimated pseudo range which is optimal (whose posterior probability distribution function of peak is maximum) as an optimal estimated pseudo range.

Figure 3:
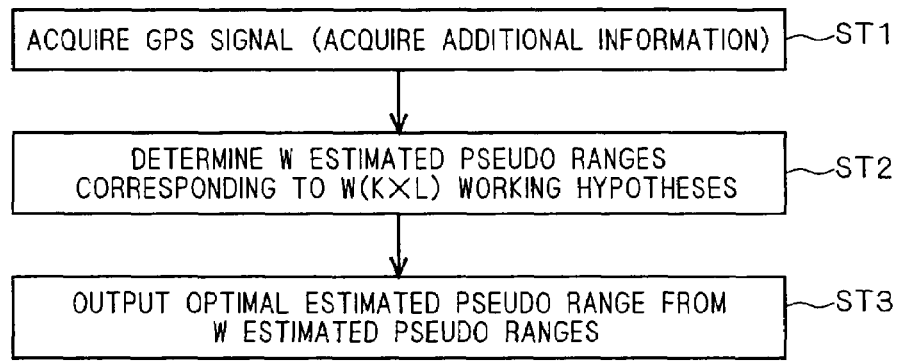
FIG. 3 is a flowchart showing a GPS positioning method using the GPS positioning apparatus in accordance with the first preferred embodiment.

FIG. 3 is a flowchart showing a manner for estimating a pseudo range in the GPS positioning apparatus in accordance with the first preferred embodiment. As shown in FIG. 3, in step ST1, the signal acquisition part 1 acquires a GPS signal S1 and obtains a GPS signal sample S2. At the same time, the additional information acquisition part 2 acquires additional information I1.

Then, in step ST2, the working hypothesis setting parts WH(1) to WH(W) and the pseudo range estimation parts PR(1) to PR(W) in the signal processing part 3 perform signal processing on the GPS signal sample S2 on the basis of the respectively-set working hypotheses, to determine estimated pseudo ranges EP1 to EPW. Further, the signal processing part 3 uses the additional information I1 for the signal processing as necessary.

After that, in step ST3, the information output part 4 outputs one estimated pseudo range whose peak value of posterior probability distribution function is maximum among the estimated pseudo ranges EP1 to EPW as an optimal estimated pseudo range.

Figure 4:
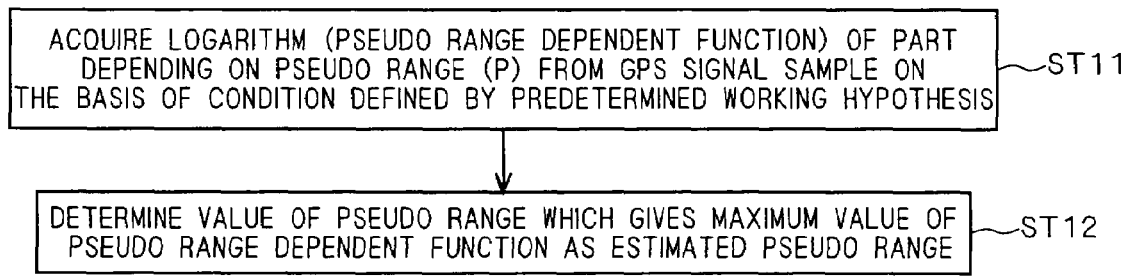
FIG. 4 is a flowchart showing a detailed process of determining an estimated pseudo range of FIG. 3.

FIG. 4 is a flowchart showing a method of determining an estimated pseudo range by using one working hypothesis setting part WH(i) (i=any one of 1 to W) and one pseudo range estimation part PR(i) among the working hypothesis setting parts WH(1) to WH(W) and the pseudo range estimation parts PR(1) to PR(W) which constitute the signal processing part 3. In other words, FIG. 4 shows a process where the pseudo range estimation part PR(i) determines an estimated pseudo range on the basis of a condition defined in the working hypothesis set by the working hypothesis setting part WH(i).

Referring to FIG. 4, in step ST11, a pseudo range dependent function in proportion to the marginal posterior probability distribution function is obtained from the GPS signal sample S2 on the basis of the condition defined in the working hypothesis set by the working hypothesis setting part WH(i). Hereinafter, a specific process of step ST11 will be discussed in detail.

First, representation of a received signal with each C/A code $x[k-j]$ as a base is derived as Eq. 6:

$$R_m[j] = \frac{1}{|Um|} \sum_{k \in Um} y[k]x[k-j] \quad (6)$$

$$= \frac{1}{|Um|} \sum_{k \in Um} ab[k-p]x[k-p]x[k-j] +$$

$$\frac{1}{|Um|} \sum_{k \in Um} n[k]x[k-j]$$

In Eq. 6, a sample which is obtained by sampling a received signal conditioned with a received signal amplitude a (>0), a pseudo range p and a navigation bit $b_m$ (m=0, 1, 2, ...) with N (KHz) is represented by y[k] (k=0, 1, 2, ...). Further, a set of sample subscripts extracted from a section of successive navigation bits on the basis of a working hypothesis set by the working hypothesis setting part WH(i) is a sample subscript set $U_m$.

In this case, the reference sign $|U_m|$ represents the number of elements included in the set $U_m$, "a" represents an amplitude of the received signal, $p \times 10^3/N$ seconds mean a time required for propagation of signal, $b[k-p]$ and $x[k-p]$ represent a value of navigation bit and a value of C/A code, respectively, when sent out and n[k] represents a noise superimposed on the received signal at the time t[k].

Then obtained is a conditional probability distribution function of the received signal expressed by Eq. 7, which is conditioned with unknown parameters such as the received signal amplitude a, the pseudo range p and the navigation bit $b_m$.

$$P(R_m \mid a, p, b_m) = \frac{1}{Z1} \exp\left[-\frac{1}{2\sigma^2}\left\{\sum_j (R_m[j] - ab_m\delta_{j,p})^2\right\}\right] \quad (7)$$

$$= \frac{1}{Z1} \exp\left[-\frac{1}{2\sigma^2}\left\{\sum_j (R_m[j])^2\right\}\right]$$

$$\exp\left(\frac{ab_m R_m(p)}{\sigma^2}\right)\exp\left(-\frac{a^2}{2\sigma^2}\right)$$

In Eq. 7, $\delta_{j,p}$ represents Kronecker delta and takes a value of "1" when j=p or a value of "0" otherwise. Further, σ represents a standard deviation of thermal noise and is determined by an equation of $\sigma^2 = kTBF$ from the Boltzmann constant k=1.38×10$^{-23}$ (J/K), an equivalent noise temperature T(K) of the receiver, a noise band B (Hz) and a noise figure F. Z1 is a constant for standardization.

After that, the conditional probability distribution function $P(R_m|a, p, b_m)$ expressed by Eq. 7 is marginalized with respect to the pseudo range p, to obtain a marginal posterior probability distribution function $P(p|R_m, a)$ of the pseudo range p. Hereinafter, a specific process for obtaining the marginal posterior probability distribution function $P(p|R_m, a)$ will be discussed.

Since it is appropriate to consider both a distribution P(p) of the pseudo range p and a distribution $P(b_m)$ of the navigation bit $\{b_m\}$ in Eq. 7 to be uniform distributions, the conditional probability distribution function of the cross-correlation function $R_m$ conditioned with the received signal amplitude a, the pseudo range p and the navigation bit $b_m$ is in proportion to the conditional probability distribution function $P(R_m|a, p, b_m)$, as expressed by Eq. 8 and Eq. 9:

$$P(R_m, p, b_m | a) = P(R_m | a, p, b_m)P(p)P(b_m) \quad (8)$$

$$P(R_m, p, b_m | a) \propto P(R_m | a, p, b_m) \quad (9)$$

Therefore, part of the posterior probability distribution function of the received signal amplitude a, the pseudo range p conditioned with the cross-correlation function $R_m[1]$ and the navigation bit $b_m$, which depends on the pseudo range p and the navigation bit $b_m$, is expressed by Eq. 10 and Eq. 11:

$$P(p, b_m \mid R_m, a) = \frac{P(R_m, p, b_m \mid a)}{P(R_m \mid a)} \quad (10)$$

$$P(p, b_m \mid R_m, a) \propto \exp\frac{ab_m R_m(p)}{\sigma^2} \quad (11)$$

These Eq. 10 and Eq. 11 are summed with respect to the navigation bit $b_m$ and marginalized with respect to the pseudo range p, to obtain the marginal posterior probability distribution function $P(p|R_m, a)$ of the pseudo range p as expressed by Eq. 12:

$$P(p \mid R_m, a) = \sum_{b_m \in \{-1,1\}} P(p, b_m \mid R_m, a) \quad (12)$$

$$= \frac{1}{Z} \cosh\left(\frac{aR_m(p)}{\sigma^2}\right)$$

In Eq. 12, the function log x represents a natural logarithm function of x and a function cosh x represents a hyperbolic cosine function of x.

A logarithm of part depending on the pseudo range p, in proportion to the marginal posterior probability distribution function of the pseudo range p when a set $\{R_m(1)\}$ of received signals is observed is expressed by Eq. 13, and the logarithm expressed by Eq. 13 is a pseudo range dependent function. Thus, it is possible to obtain the pseudo range dependent function in proportion to the marginal posterior probability distribution function from the GPS signal sample S2 on the basis of the condition defined in a working hypothesis.

$$\log\prod_m P(p \mid R_m, a) = \sum_m \log\cosh\left(\frac{aR_m(p)}{\sigma^2}\right) \quad (13)$$

Then, in step ST12, a value of pseudo range p which gives the maximum value of the pseudo range dependent function expressed by Eq. 13 is determined as an estimated pseudo range. Hereinafter, a specific process for determining the estimated pseudo range will be discussed.

In a step of designing a GPS receiver, the minimum receiving sensitivity is determined and a value of the received signal amplitude a is determined from the amplitude of a signal corresponding to the minimum sensitivity. At that time, by selecting the subscript p which maximizes the right side, in other words, selecting a value of pseudo range p which gives the maximum value of the pseudo range dependent function which is the logarithm expressed by Eq. 13, a statistically optimal pseudo range can be determined as an estimated pseudo range.

The above-discussed determination of estimated pseudo range is performed respectively for W combinations of the working hypothesis setting parts WH(1) to WH(W) and the pseudo range estimation parts PR(1) to PR(W) in the signal processing part 3, and as a result, W estimated pseudo ranges Ep1 to EPW are determined.

Thus, in the GPS positioning method of the first preferred embodiment, by summation with respect to the navigation bit $b_m$ and marginalization with respect to the pseudo range p, it is possible to measure the pseudo range p with high accuracy even if the navigation bit is unknown.

Further, by using the hyperbolic cosine function and the logarithmic function nonlinear function as the pseudo range dependent function which is a function of part of the marginal posterior probability distribution function which depends on the pseudo range, the posterior probability distribution function can be maximized in the strict sense and this advantageously makes it possible to measure the pseudo range p with high sensitivity.

Furthermore, the information output part 4 outputs one out of the estimated pseudo ranges EP1 to EPW obtained by the signal processing part 3, whose posterior probability distribution function is optimal, as an optimal estimated pseudo range, and it is therefore possible to further improve the estimation accuracy of the pseudo range.

The Second Preferred Embodiment

In the second preferred embodiment, instead of the nonlinear function $y=\log \cosh(x)$ appearing in Eq. 13 of the marginal posterior probability distribution function, an approximation function consisting of partial approximation functions corresponding to one or more sections is used.

As shown in the second preferred embodiment, by using the approximation function consisting of the partial approximation functions, it is possible to reduce the labor needed for calculation and determine an estimated pseudo range with almost no loss of accuracy. In other words, it is possible to reduce the time and cost for calculation of a posterior probability distribution function, and it is further possible to reduce the mounting cost of an apparatus for achieving faster signal processing and performing the GPS positioning method.

As an example of the above approximation function, the approximation function expressed by Eq. 14 may be used. In Eq. 14, a function of the first line is the partial approximation function of the first section ($|x|>1$) and a function of the second line is the partial approximation function of the second section ($|x|\leq 1$).

$$y = \begin{cases} y = |x| - \frac{1}{2} & (|x| > 1) \\ \frac{x^2}{2} & (|x| \leq 1) \end{cases} \quad (14)$$

Not limited to this example, instead of the function $y=\log \cosh(x)$, an approximation function is set by setting one or more sections as the domain of x.

In this case, if there is a boundary of sections, the partial approximation functions for the respective sections are connected to each other at the boundary of the sections to constitute an approximation function. Further, sections having small absolute values of variable x and sections having large absolute values of variable x are discriminated, and a quadric function of the variable x is used in the sections having small absolute values of variable x and a linear function of the absolute value function $|x|$ is used in the sections having large absolute values of variable x, to constitute the approximation function consisting of the partial approximation functions corresponding to the sections.

The Third Preferred Embodiment

Instead of the nonlinear function $y=\log \cosh(x)$ appearing in Eq. 13 of the marginal posterior probability distribution function, a table approximation function implemented by dividing the function into one or more sections and making a correspondence of inputs and outputs (x and y) for each section in a table may be used.

As shown in the third preferred embodiment, by using the table approximation function, it is possible to reduce the labor needed for calculation and estimate a pseudo range with almost no loss of accuracy. In other words, it is possible to reduce the time and cost for calculation of a posterior probability distribution function, and it is further possible to reduce the mounting cost of an apparatus for achieving faster signal processing and performing the GPS positioning method. As an example of the table approximation function, the table approximation function shown in Table 1 may be used. In Table 1, the item x of each line represents a section and the item y of the same line represents an output value in the corresponding section.

TABLE 1

| y | x |
|---|---|
| 0 | $0 \leq |x| < 0.001$ |
| 0.0000005 | $0.001 \leq |x| < 0.002$ |
| 0.000002 | $0.002 \leq |x| < 0.003$ |
| ... | ... |
| 100 | $100 \leq |x|$ |

While the invention has been shown and described in detail, the foregoing description is in all aspects illustrative and not restrictive. It is therefore understood that numerous modifications and variations can be devised without departing from the scope of the invention.

The invention claimed is:

1. A GPS positioning method for estimating a pseudo range from a GPS signal, comprising the steps of:
   (a) acquiring a signal sample by receiving said GPS signal;
   (b) acquiring a pseudo range dependent function which is a function of pseudo range in proportion to a marginal posterior probability distribution function of pseudo range from said signal sample on the basis of a condition defined by a predetermined working hypothesis; and
   (c) determining a value of pseudo range which gives the maximum value of said pseudo range dependent function as an estimated pseudo range, wherein
   said pseudo range dependent function includes a hyperbolic cosine function.

2. The GPS positioning method according to claim 1, wherein
said pseudo range dependent function includes a logarithmic function.

3. The GPS positioning method according to claim 1, wherein
said pseudo range dependent function includes an approximation function consisting of partial approximation functions corresponding to sections.

4. The GPS positioning method according to claim 1, wherein
said pseudo range dependent function includes a table approximation function which sets an input/output relation for each of one or more sections.

5. The GPS positioning method according to claim 1, wherein
said predetermined working hypothesis includes a plurality of working hypotheses on the basis of specifics of navigation bit boundary and frequency correction,
said pseudo range dependent function includes a plurality of pseudo range dependent functions corresponding to said plurality of working hypotheses,
said estimated pseudo range includes a plurality of estimated pseudo ranges, and
said step (c) includes a step of determining a value of pseudo range which gives the maximum value of each of said plurality of pseudo range dependent functions as the corresponding one of said plurality of estimated pseudo ranges,
said GPS positioning method further comprising the step of
(d) determining one of said plurality of estimated pseudo ranges whose corresponding pseudo range dependent function is optimal as an optimal estimated pseudo range.

6. A GPS positioning apparatus for estimating a pseudo range from a GPS signal, comprising:
a signal acquisition part for acquiring a signal sample by receiving said GPS signal; and
a signal processing part for determining an estimated pseudo range by performing signal processing on the basis of said signal sample,
wherein said signal processing part acquires a pseudo range dependent function which is a function of pseudo range in proportion to a marginal posterior probability distribution function of pseudo range from said signal sample on the basis of a condition defined by a predetermined working hypothesis, and determines a value of pseudo range which gives the maximum value of said pseudo range dependent function as an estimated pseudo range, wherein said pseudo range dependent function includes a hyperbolic cosine function.

* * * * *